United States Patent Office 3,435,942
Patented Apr. 1, 1969

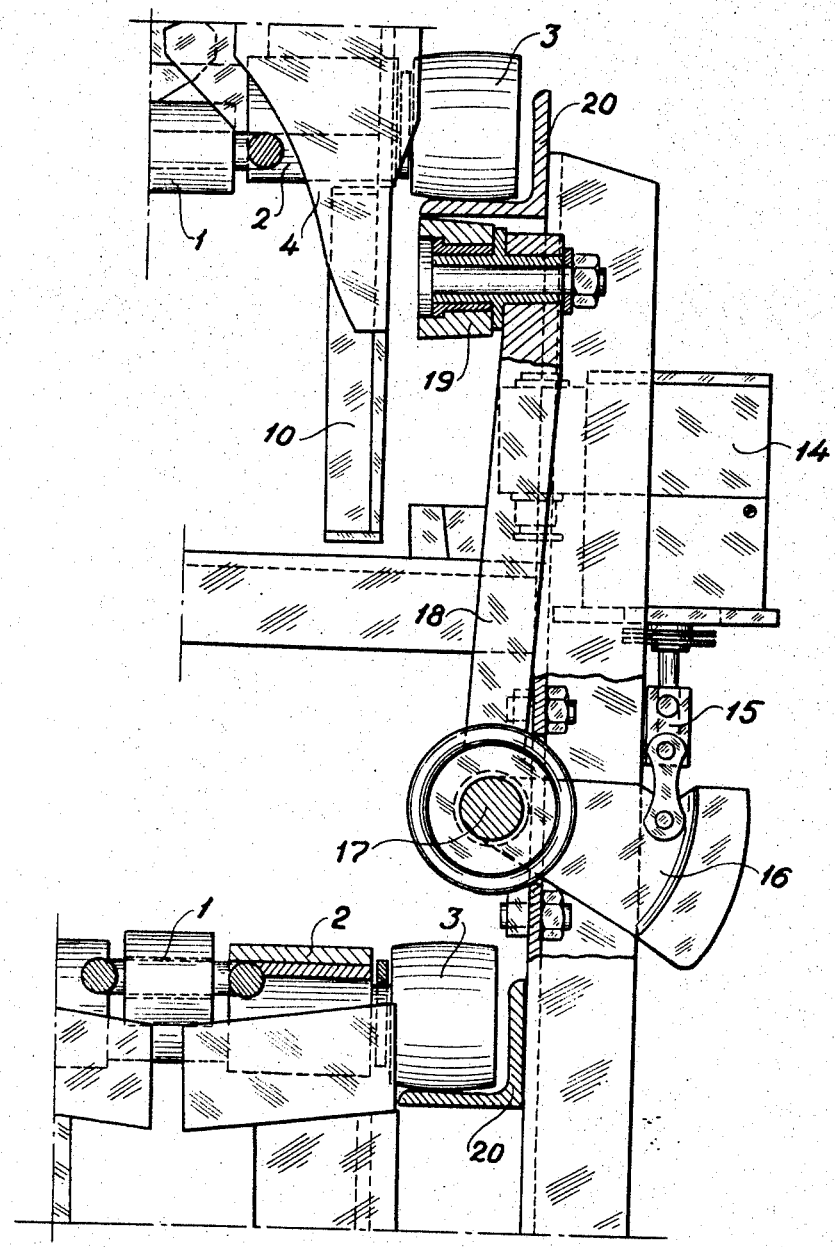

3,435,942
LOAD TRANSPORTING AND DUMPING
CONVEYOR
Erkki T. Lehtola, Kaskinen, Finland, assignor to Oy
Tahka AB, Kaskinen, Finland, a corporation of
Finland
Filed Aug. 23, 1966, Ser. No. 574,364
Claims priority, application Finland, Aug. 25, 1965,
2,034/65
Int. Cl. B65g 47/38, 17/16
U.S. Cl. 198—155     4 Claims

ABSTRACT OF THE DISCLOSURE

Apparatus for transporting and unloading articles and particularly for transporting and unloading elongated articles, such as logs. A tiltable article-carrying element is advanced along a predetermined path by a power-driven chain or the like. When the element carrying an article reaches a predetermined point, an unloading means is moved into the path of the carrying element, whereby the carrying element is titled so as to cause the article to be discharged therefrom.

---

Figure 1:
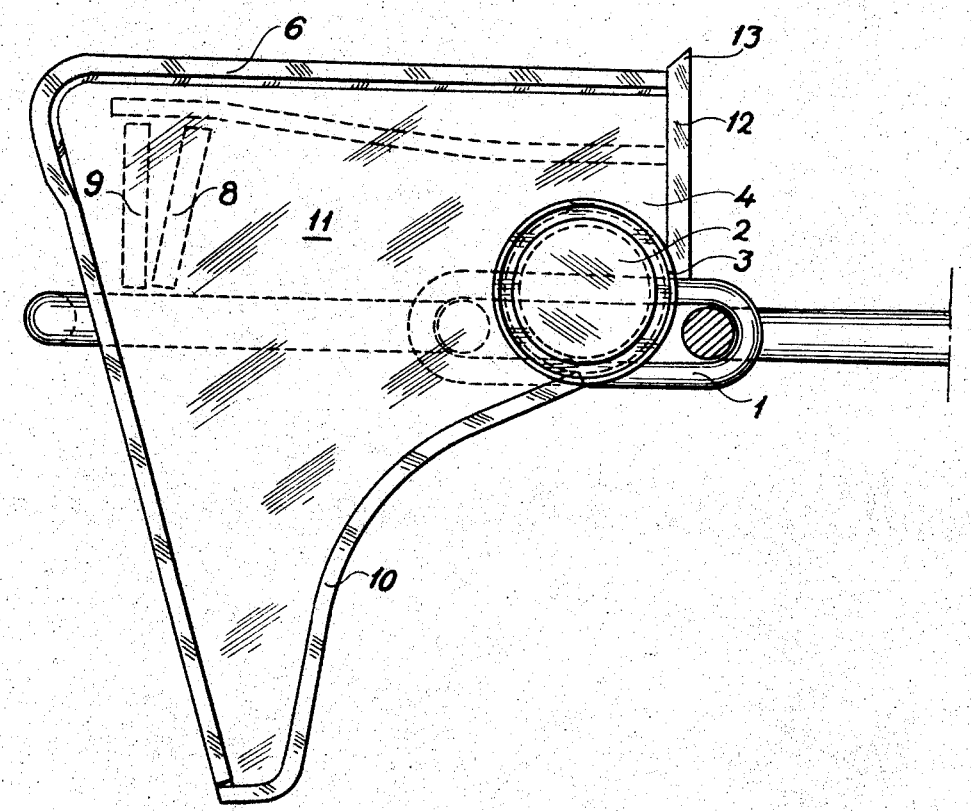

The present invention relates to carrier elements for transporters of elongated articles, such as logs or the like, provided with unloading means. The object of the invention is to provide a carrier element which is reliable in operation and which decreases the power requirement of the transporter, by means of which carrier element an article such as a log, is moved along in a transporter and dropped at a desired point on either of the two sides of the transporter.

When transporting elongated articles, such as logs, which have to be dropped from the transporter at different sorting points at each side of the transporter, one of the following three methods generally is used.

(1) The article is pushed down from the transporter by means of an element.

(2) Several carrier elements of the transporter supporting the piece are dropped down from the side where the article is to be dropped, whereupon the article rolls along the adjacent carrier element and drops out of the transporter.

(3) The carrier elements supporting the article are lifted up on the side opposite the side where the article is to be dropped.

Means utilizing the first method generally have the drawback that articles, such as logs, are pushed to the side, often have a lateral movement, which is inconvenient from the point of view of the dropping movement, so that they do not drop straightly and evenly, but generally drop with one end ahead, whereupon the pieces easily jump up and down when they stop, and get disarranged. Furthermore, such means require relatively powerful separate drive means, thus increasing the consumption of power.

Means applying the second method have the drawback that when overlong pieces are transported, these may remain hanging on the carrier elements situated next to the carrier elements to be dropped, in which case the pieces either do not drop at all or fall obliquely since one end of the piece remains supported on a carrier element which has not been dropped down. (See for instance the Finnish patent specification No. 32,552.)

Apparatus utilizing the third method may require a very considerable power consumption, since in addition to the carrier elements and the piece supported on them, in this case also the transporter chain between the carrier elements have to be raised. (See, e.g., the Finnish patent specification No. 33,316.)

The carrier element according to the present invention belong generally to the third group, but by virtue of their improved construction it is possible to decrease the power consumption by more than half that required for known devices of this general type.

The principal characteristics of carrier elements according to the invention will be apparent from the description which follows.

The invention is described more in detail in the following description with reference to the accompanying drawings, which, as an example, show a preferred embodiment of a carrier element according to the invention and its adaptation to a log sorting transporter.

Figure 2:
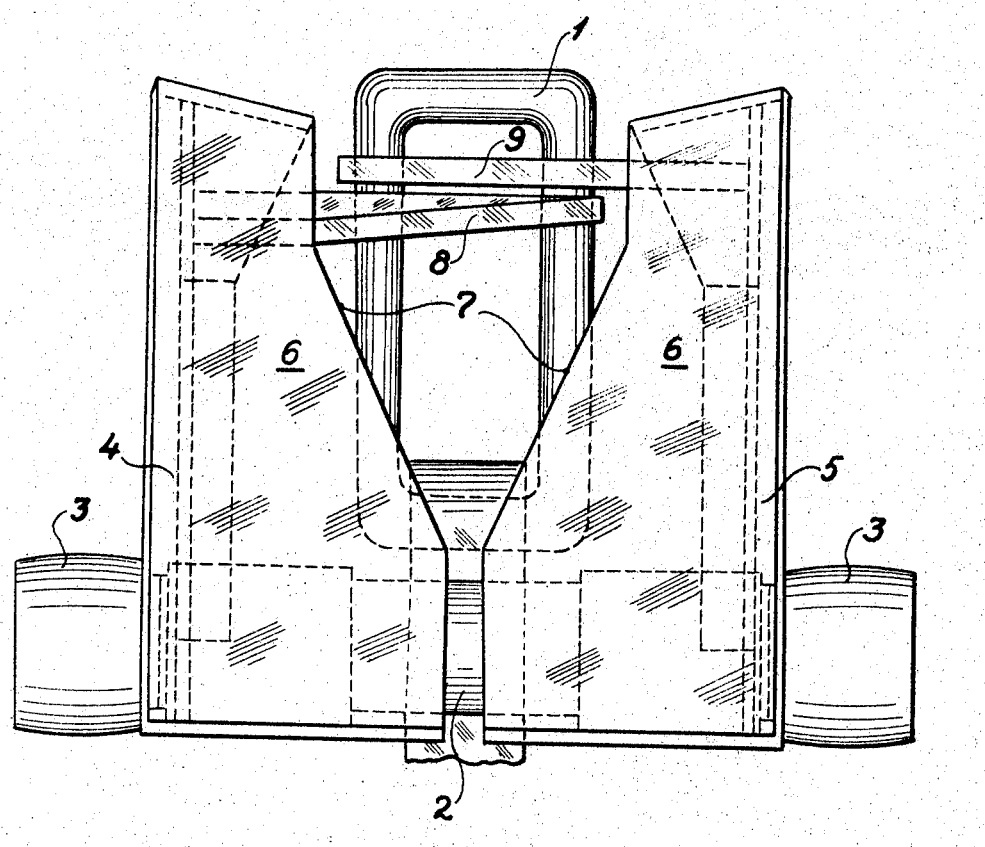
Figure 3:
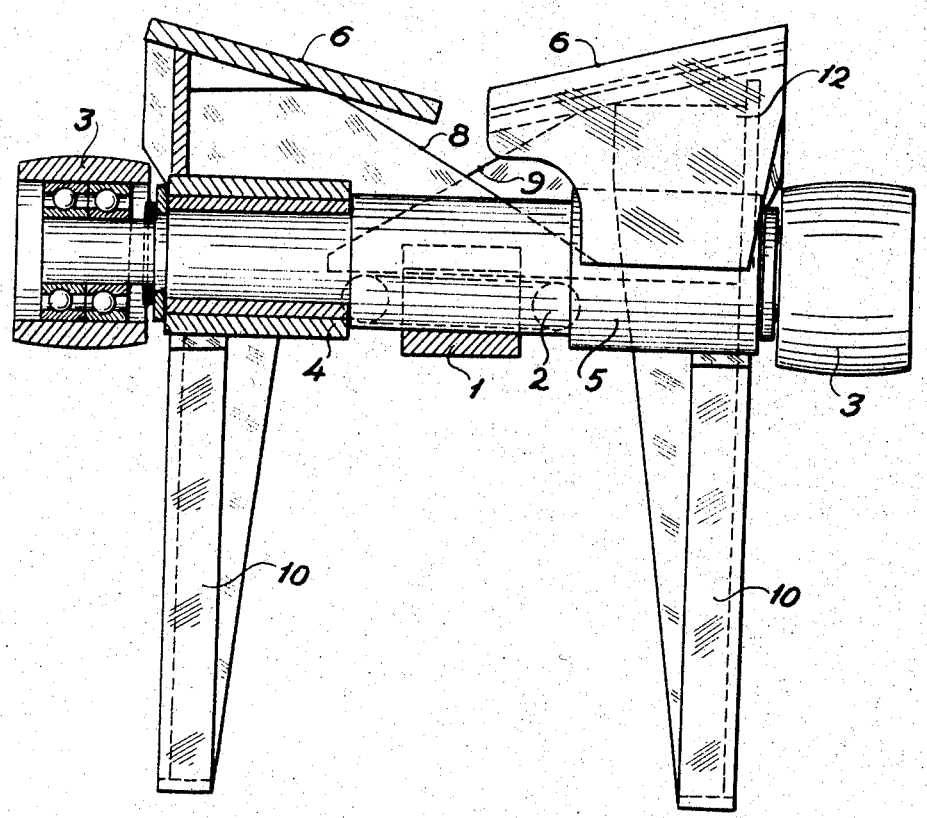

In the drawings:

FIGURE 1 is an elevational view of a carrier element embodying the invention, as viewed from one side, FIGURE 2 is a plan view of the same, FIGURE 3 is an elevational view of the carrier element, as viewed from the forward end, partially in section, and FIGURE 4 is a partially sectional view of the lifting means of the carrier element.

In the drawing a transporter chain is shown at 1, having solidly attached to itself a rake shaft 2. At each end of the shaft 2, wheels or rollers 3 (FIG. 2) are mounted for rotation, while halves 4 and 5 of the carrier elements are mounted between the rollers and the chain. Each of the carrier element halves 4 and 5 is provided with a supporting surface 6, which is inclined toward slightly downwardly the center of the carrier element, the halves thus forming a low V-shape. The edges 7 of the supporting surfaces 6 facing toward the center of the carrier element are partially bevelled to form an angle, with its point toward the direction of the transporter movement. Each of the carrier element halves 4 and 5 is provided at the rear portion of the supporting surface with transversal stops 8 and 9, which during operation of the transporter are supported against the upper surface of the chain 1. The carrier elements 4 and 5 are further provided with cam faces 10 (FIG. 1) curving at a slope rearward and downward from shaft 2. Supporting surfaces 6 and cam surface 10 are connected to each other by means of a sheet structure 11 so that each carrier element half constitutes a separate whole which can turn around the shaft 2.

The forward end of supporting surface 6 terminates in a vertical end plate 12, with its upper edge preferably extending upward a little past the plane of the supporting surface 6, and terminating with a sharp edge 13 to keep a log engaged thereby fixed firmly during a transporting operation.

The construction and operation of the transporter are set forth and described more in detail in the following description, with special reference to FIGURE 4. The carrier elements 4 and 5 preferably are spaced uniformly in the log sorting transporter so that the shortest logs to be transported always will be supported by at least two carrier elements. The dropping means are mounted adjacent to each sorting compartment so that only two of the carrier elements will serve as dropping means. The logs are dropped on the carrier elements so that the center of gravity of each log is situated substantially centrally between the two dropping carrier elements. When a log to be discharged reaches a position adjacent to the compartment into which it is to be dropped, a magnet 14 (FIG. 4) is energized and raises a rod 15 which is attached to the armature of the magnet 14 and to a weighted arm 16. The arm 16 is secured rigidly to a shaft 17 so that when the arm 16 is moved upwardly by the magnet 14, it causes the shaft 17 to rotate in a counter-clockwise direction. An arm 18 is secured to the shaft 17 for rotation therewith and a camming wheel 19 is attached to the upper end of the arm 18.

When the arm 16 rotates in a counter-clockwise direction, as seen in FIG. 4, it moves the arm 18 and the camming wheel 19 to the left, as seen in FIG. 4. The camming wheel 19 assumes a position where it will be engaged by the cam surface 10 on the next carrier element 4 which is advanced therepast. As the carrier element 4 moves forward, the cam surface 10 engages the camming wheel 19, and thus forces the carrier element to turn about the shaft 2 rearward and upward at a speed and in a manner depending on the speed of the transporter and also on the shape of the cam surface 10. The supporting surface 6 also is turned upward and forward about shaft 2. This takes place simultaneously in two carrier elements, causing the log to roll away from the carrier elements. The bevelled edges 7 are here advantageous, providing a smooth rolling movement of the log without sudden jumping.

From the above description it is apparent that the invention has the following remarkable advantages, which all decrease power consumption: The carrier elements are mounted to move along rails 20 supported on rollers 3 mounted in bearings, thus avoiding any dragging friction due to the chain or other parts and substituting the considerably less rolling friction for the same. For the dropping operation no separate power sources are required except a magnet with negligible power consumption. When dropping the log, power is needed only for lifting the log and one half of the carrier elements, since the other parts remain in their original position during the dropping operation. Thus also any sudden clashes due to a whole carrier element falling back on the rails are avoided.

I claim:

1. Apparatus for transporting and unloading articles, which comprises an endless conveyor, a plurality of article carriers mounted pivotally upon the conveyor, vertical plates mounted on the sides of the carriers, each plate having the forwardly extending surface thereof contoured so as to form a cam, cam engaging means positioned adjacent to the carriers, and means for selectively moving the cam-engaging means into the path of the cam surfaces, whereby the associated carriers are caused to be displaced by the cam surfaces and thereby unload articles positioned thereon.

2. Apparatus in accordance with claim 1, wherein the cams comprise vertical plates mounted pivotally on the carrier and having their forward edges contoured so as to form cam surfaces.

3. Apparatus in accordance with claim 2 wherein the side plates are mounted pivotally on the carriers near the top of the plates and the cam surfaces on the plates extend backwardly and downwardly toward the trailing ends of the side plates, whereby when the cam-engaging means is moved into the path of a side plate the plate is rotated rearwardly and upwardly so as to cause the discharge of an article from the carrier.

4. Apparatus in accordance with claim 3, wherein a plurality of adjacent carriers jointly support an elongated article, and a plurality of cam-engaging means are provided to engage the cams on the article-supporting carriers simultaneously so as to discharge the elonagted article from the carriers supporting it.

References Cited

UNITED STATES PATENTS 3,322,290  5/1967  Ahlstedt _____ 214—62

FOREIGN PATENTS 419,895  10/1925  Germany.

ROBERT G. SHERIDAN, *Primary Examiner.*

U.S. Cl. X.R.

214—62; 198—200